(No Model.)
E. C. FISHER.
CORN PLANTER.
No. 476,624. Patented June 7, 1892.
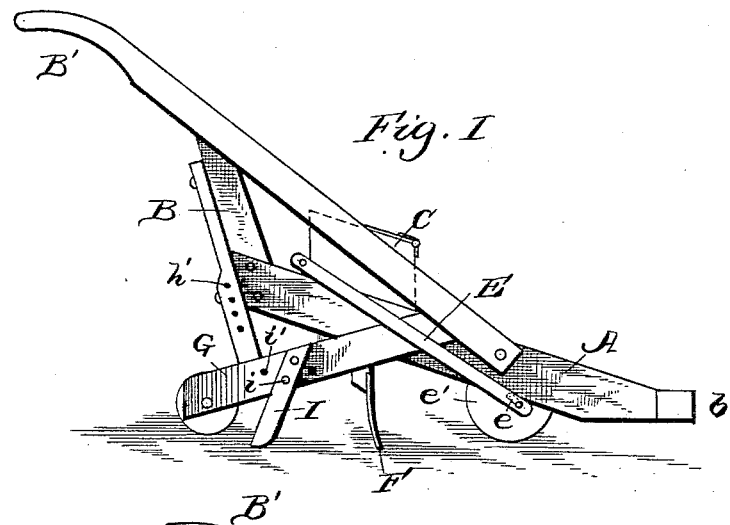
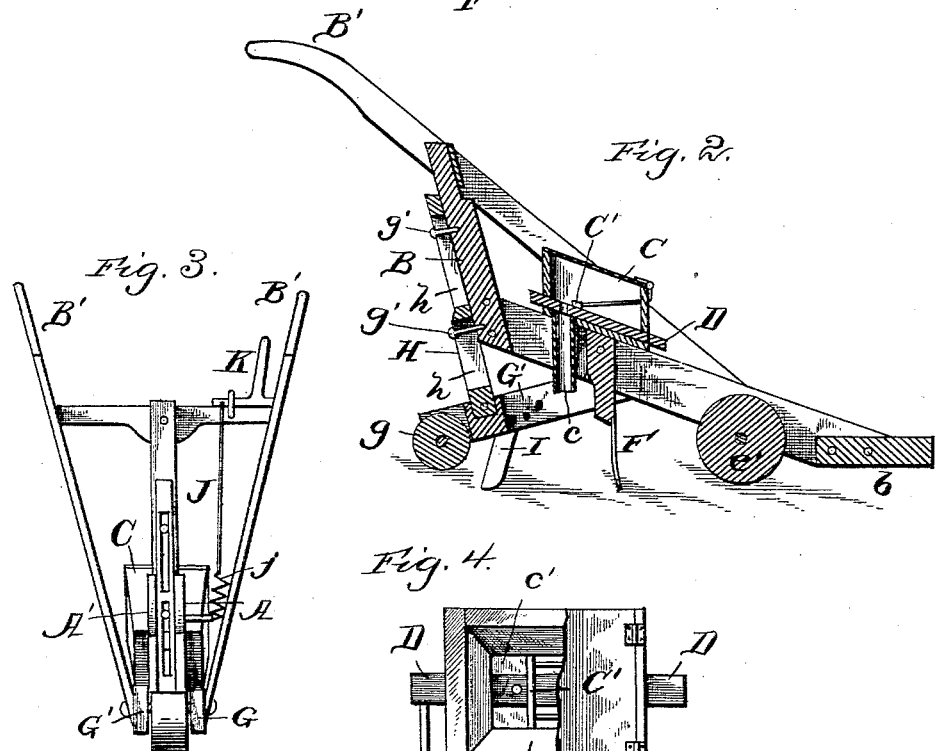
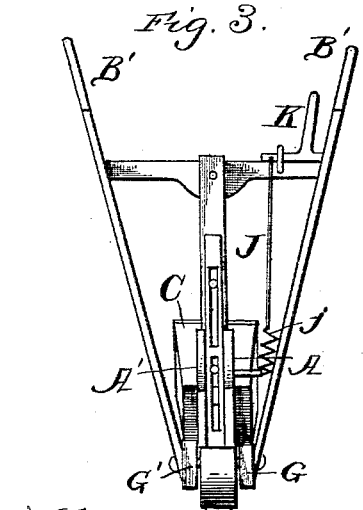
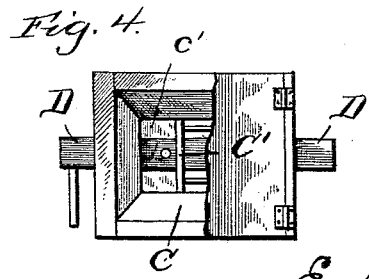
Witnesses:
J. B. McGirr.
William O. Belt.
Inventor.
E. C. Fisher
By his Attorneys
Edson Bros

UNITED STATES PATENT OFFICE.

ELBEN CLARK FISHER, OF SISSONVILLE, WEST VIRGINIA.

CORN-PLANTER.

SPECIFICATION forming part of Letters Patent No. 476,624, dated June 7, 1892.

Application filed July 24, 1891. Serial No. 400,642. (No model.)

*To all whom it may concern:*

Be it known that I, ELBEN CLARK FISHER, a citizen of the United States, residing at Sissonville, in the county of Kanawha and State of West Virginia, have invented certain new and useful Improvements in Corn-Planters; and I do hereby declare the following to be a full, clear, and exact description of the invention, such as will enable others skilled in the art to which it appertains to make and use the same.

My invention relates to improvements in corn-planters; and the object of my invention is to provide a simple and inexpensive machine which is adapted for automatic operation and is readily convertible from a planter to a cultivator.

With these and other ends in view my invention contemplates the use of a beam comprising two parallel pieces secured together, a standard fixed in the rear of the beam, and the usual handles fixed in their usual position. On the top of the beam is secured a hopper, and a dropper or feed slide is arranged to reciprocate over an opening in the bottom of the hopper by a pitman connection with the crank-shaft of a ground-wheel, which is arranged between the two members of the beam and in front of the hopper. Pivotally secured to the beam between the hopper and the wheel are two arms which extend rearward behind the hopper, and a small ground-roller is journaled in bearings in the rear ends thereof. The beams carry the coverers, and a slotted upright is secured in front of the small ground-roller and is adapted to be adjusted at any height to regulate the action of the coverers. A plowshare is arranged between the two pieces in front of the hopper, which opens a furrow for the corn to drop in.

To adapt the machine to act solely as a hand-planter, the pitman is disconnected from the dropper-bar and a spring connection is made between the dropper-bar and a crank-lever fixed to one handle, whereby the dropping may be readily controlled and accomplished by hand.

My invention consists, further, of certain details of construction and arrangement of parts, which will more fully appear hereinafter.

In the accompanying drawings, Figure I is a side elevation of my improved machine adapted for automatic operation. Fig. II is a longitudinal central sectional view. Fig. III is a rear elevation showing the machine adapted to be operated by hand, and Fig. IV is a top plan view of the hopper.

Referring to the drawings, in which like letters of reference denote corresponding parts in all the figures, A A' designate the two parallel pieces, which are secured together in a suitable manner to form an intermediate space, which connected parts constitute the main beam of the machine. An upright standard B is arranged in the rear end of the main beam, and the ordinary handles B' are secured in their usual position. A draft-bar $b$ is provided at the forward end of the beam.

Situated on the main beam between the handles is a hopper C, which is provided with an outlet-spout $c$, depending for a suitable distance below the beam and passing between the two members of the main beam and a cut-off C' or its equivalent is arranged within the hopper. The supporting-arms of the stop or abutment or cut-off are secured to one of the sides of the hopper, and a cross-piece fixed on the ends thereof is arranged to rest on the feed-slide D. This stop or abutment serves to sweep or brush the grains away from the opening in the slide as the latter is reciprocated and prevents too many grains from getting in said opening and interfering with the proper operation of the feed-slide. This hopper is provided with a metallic bottom $c'$, and a dropper or feed slide D is arranged to reciprocate in the hopper. This slide is provided with one or more openings adapted to align with an opening in the bottom of the hopper to permit the grain in the hopper to be deposited in the ground.

The dropper-bar or feed-slide D is actuated by means of suitable connections with a pitman E, arranged to operate on one side of the hopper, and this pitman is connected to the crank-shaft $e$ of a ground-wheel $e'$, journaled in bearings in the beam in front of the hopper. The machine is partially sustained by this ground-wheel $e'$, and at each revolution of said wheel the feed-slide D is reciprocated in the hopper, thus allowing the grain to drop through the spout $c$ into the furrow opened by the plow F, arranged in front of the spout $c$ and in rear of the ground-wheel $e'$.

The distance between the hills will of course depend upon the number of holes in the feed-slide and the size of the ground-wheel. Thus if one hole is provided at each end of the stroke of the slide the corn will be dropped into two hills to each revolution of the ground-wheel, and if but one hole is provided, as shown, at the end of the stroke there will be but one hill planted at each revolution of the ground-wheel, and so on.

In order to adapt the machine to be adjusted to varying depths, I provide a frame extending in rear of the hopper, which consists of the two parallel pieces G G', in the rear ends of which is journaled a shaft carrying the ground-roller $g$. An upright post H, provided with a longitudinal slot $h$, is secured between the two pieces G G' in front of the ground-roller $g$, and it extends upward in line with the upright piece B and is guided in its vertical movement on pins $g'$, which project outward from the upright B through the slot $h$ in the post H. This post is provided with a series of transverse holes $h'$ and a pin is inserted in said holes beneath one of the pins $g'$, so that the frame is adapted to move a limited distance in a vertical direction by simply adjusting the pin in the transverse holes, and at the same time the frame can move downward a short distance and thus adjust itself to any unevenness in the ground or be lifted entirely from the ground to be carried from field to field.

Secured on either side of the two pieces G G' are the coverers I, which are arranged between the furrow-opening plow F and the ground-roller $g$, and they can be adjusted by inserting a pin $i$ through a hole in the coverer and in one of a series of holes $i'$ in the side pieces G G'. As the machine is drawn along the plow F opens the furrow and the grain drops into the same, and then the coverers throw the dirt over the furrow and the covering-roller presses the dirt down over the deposited grain. By means of the adjustable frame, which is pivoted to the main frame, the machine can be regulated to soil of different kinds and the machine adapted to do various kinds of planting.

When it is desired to use the machine as a check-row planter, the pitman connection E is removed and a rope J is attached to the pin in the rear end of the feed-slide. The other end of this rope is attached to one end of an arm of a bell-crank lever K, pivoted on one of the handles of the machine, and a spring $j$ is arranged in connection with the rope J to assist in the ready and easy operation of the slide. By this means the operation of planting can be done by hand and the same can be accomplished very easily and quickly.

I am aware that changes in the form and proportion of parts and details of construction can be made without departing from the spirit or sacrificing the advantages of my invention, and I therefore reserve the right to make such changes as fall within the scope of my invention.

Having thus fully described my invention, what I claim as new, and desire to secure by Letters Patent, is—

1. In a corn-planter, the combination of the parallel pieces A A', a hopper, a feed-slide adapted to reciprocate in said hopper, the frame pivotally secured to said pieces A A' and extending in rear of the hopper, and the slotted post H, secured to the pivoted frame and adjustable on the upright B, substantially as described.

2. In a corn-planter, the main beam consisting of the parallel pieces A A', the upright B, secured in the rear ends thereof, the ground wheel, the hopper mounted on said beam and having a spout $c$, extending downward between the same, the two pieces G G', pivoted to the main beam in front of the hopper and extending behind the same, the post H, secured between the pieces G G' and projecting upward in contact with the upright B, the slot $h$ in said post, and the pins $g'$ on the upright B, which pass through said slot and guide the post in its vertical movement, substantially as described.

In testimony whereof I affix my signature in presence of two witnesses.

ELBEN CLARK FISHER.

Witnesses:
A. J. HUMPHREYS,
A. P. FRY.